(12) United States Patent
Ashcraft et al.

(10) Patent No.: US 11,513,798 B1
(45) Date of Patent: Nov. 29, 2022

(54) IMPLEMENTATION OF LOAD ACQUIRE/STORE RELEASE INSTRUCTIONS USING LOAD/STORE OPERATION WITH DMB OPERATION

(71) Applicant: Ampere Computing LLC, Santa Clara, CA (US)

(72) Inventors: Matthew Ashcraft, Belmont, CA (US); Christopher Nelson, Santa Clara, CA (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 16/424,138

(22) Filed: May 28, 2019

Related U.S. Application Data

(63) Continuation of application No. 14/243,949, filed on Apr. 3, 2014, now abandoned.

(51) Int. Cl.
| | | |
|---|---|---|
| *G06F 12/00* | (2006.01) | |
| *G06F 9/30* | (2018.01) | |
| *G06F 9/38* | (2018.01) | |

(52) U.S. Cl.
CPC ........ *G06F 9/3004* (2013.01); *G06F 9/30043* (2013.01); *G06F 9/30087* (2013.01); *G06F 9/3834* (2013.01)

(58) Field of Classification Search
CPC .............. G06F 9/3004; G06F 9/30043; G06F 9/30087; G06F 9/3834
See application file for complete search history.

(56) References Cited

U.S. PATENT DOCUMENTS

| | | | |
|---|---|---|---|
| 4,106,090 A | 8/1978 | Erickson et al. | |
| 6,026,029 A | 2/2000 | Dosaka et al. | |
| 6,546,462 B1 * | 4/2003 | Palanca | G06F 12/0804 |
| | | | 711/135 |
| 6,681,317 B1 * | 1/2004 | Mathews | G06F 9/383 |
| | | | 712/203 |
| 6,725,340 B1 * | 4/2004 | Guthrie | G06F 9/30087 |
| | | | 711/141 |
| 7,984,202 B2 | 7/2011 | Hofmann et al. | |

(Continued)

FOREIGN PATENT DOCUMENTS

| | | |
|---|---|---|
| EP | 679993 A2 | 11/1995 |
| JP | 2005-332387 A | 12/2005 |

OTHER PUBLICATIONS

ARMv8 Instruction Set Overview Architecture Group (Year: 2013).*

(Continued)

*Primary Examiner* — Gurtej Bansal
(74) *Attorney, Agent, or Firm* — Muncy, Geissler, Olds & Lowe, P.C.

(57) ABSTRACT

A system and method are provided for simplifying load acquire and store release semantics that are used in reduced instruction set computing (RISC). Translating the semantics into micro-operations, or low-level instructions used to implement complex machine instructions, can avoid having to implement complicated new memory operations. Using one or more data memory barrier operations in conjunction with load and store operations can provide sufficient ordering as a data memory barrier ensures that prior instructions are performed and completed before subsequent instructions are executed.

24 Claims, 8 Drawing Sheets

(56) References Cited

U.S. PATENT DOCUMENTS

| | | | |
|---|---|---|---|
| 8,117,367 | B2 | 2/2012 | Conti et al. |
| 8,332,564 | B2 | 12/2012 | Matterne et al. |
| 8,347,012 | B2 | 1/2013 | Goss et al. |
| 8,352,682 | B2 | 1/2013 | Speier et al. |
| 8,607,006 | B2 | 12/2013 | Riocreuz et al. |
| 2003/0084259 | A1* | 5/2003 | Palanca ............ G06F 9/3012 711/163 |
| 2005/0273583 | A1 | 12/2005 | Caprioli et al. |
| 2008/0163220 | A1 | 7/2008 | Wang et al. |
| 2010/0077143 | A1 | 3/2010 | Reid et al. |
| 2010/0199054 | A1* | 8/2010 | Kishore ............ G06F 9/3004 711/162 |
| 2012/0198214 | A1 | 8/2012 | Gadre et al. |
| 2013/0263141 | A1* | 10/2013 | Asaro ............ G06F 9/3834 718/102 |
| 2014/0089589 | A1 | 3/2014 | Meier et al. |
| 2015/0046652 | A1 | 2/2015 | Hechtman et al. |

OTHER PUBLICATIONS

ARM Limited, ARMv7-M Architecture Reference Manual, available at https://web.archive.org/web/20120901000000*/https://web.eecs.umich.edu/~prabal/teaching/eecs373410/readings/ARMv7-M ARM_pdf (Year: 2012).

ARM Limited, "ARMv8 Instruction Set Overview", Jun. 3, 2013, Document No. PRD03-GENC-010197 30.0.

Terekhov; Alexander, Sewell; Peter, C/C++11 mappings to processor, Dec. 22, 2011, Archive Date: Sep. 7, 2012, http://www.cl.cam.ac.uk/-pes20/cpp/cpp0xmappings.html.

International Search Report & Written Opinion for PCT Application No. PCT/US2015/041322, dated Apr. 20, 2016, 11 pages.

Preshing; Jeff, "Acquire and Release Semantics," Sep. 13, 2012, Preshing on Programming, http://preshing.com/20120913/acquire-and-release-semantics/.

European Patent Office, Communication, Extended European Search Report, European Patent Application No. 15899072.1, Mar. 18, 2019, 6 pages, Germany.

U.S. Appl. No. 14/243,949, filed Apr. 3, 2014, 2015-0317158, Published.

* cited by examiner

IMPLEMENTATION OF LOAD ACQUIRE/STORE RELEASE INSTRUCTIONS USING LOAD/STORE OPERATION WITH DMB OPERATION

TECHNICAL FIELD

The subject disclosure relates to memory operation ordering in a reduced instruction set computing environment.

BACKGROUND

In lock free computing, there are two ways in which threads can manipulate shared memory, they can compete with each other for a resource, or they can pass information co-operatively from one thread to another. Acquire and release semantics are used to accomplish passing information cooperatively from one thread to another. Acquire and release semantics provide a structural system for ensuring that memory operations are ordered correctly to avoid errors. Store release instructions ensure that all previous instructions are completed, and load-acquire instructions ensure that all following instructions will complete only after it completes. Accordingly, to properly order memory operations using acquire and release semantics, complex combinations of store release and load acquire instructions are necessary.

The above-described description is merely intended to provide a contextual overview of current techniques for performing memory operation ordering and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

A system and method are provided for simplifying load acquire and store release semantics that are used in reduced instruction set computing (RISC). Various embodiments also provide for ordering memory operations with respect to the instructions disclosed herein. A typical load with acquire instruction only requires that memory operations after the load with acquire are ordered after the load with acquire—it does not impose any order on the instructions before the load with acquire (both with respect to the load with acquire and to the subsequent instructions). In an embodiment of the disclosure however, a load with acquire comprises a data memory barrier that is used in conjunction with a load operation which guarantees that all accesses prior to and including the load with acquire are ordered before all access from instructions after the load with acquire.

Similarly, traditional store with release instructions impose ordering between the access from the store with release and the accesses of all prior instructions (but not subsequent instructions). In an embodiment of the disclosure, however, a data memory barrier at the beginning of the store with release provides a strong ordering between prior access and the access associated with the store with release.

In an example embodiment, a system comprises a processor that executes computer-executable instructions to perform operations. The instructions can include a load with acquire instruction that performs memory operation ordering, wherein the load with acquire instruction comprises a load operation followed by a data memory barrier operation.

In another example embodiment, a method comprises executing instructions in a processor. The method can include a load with acquire instruction for performing memory operation ordering, wherein the executing the load with acquire instruction comprises executing a load operation followed by a data memory barrier operation.

In an example embodiment, a system comprises a processor that executes computer-executable instructions to perform operations. The instructions can include a store with release instruction that performs memory operation ordering, wherein the store with release instruction comprise a first data memory barrier operation followed by a store operation followed by a second data memory barrier operation.

In an example embodiment, a method comprises executing instructions in a processor. The method can include a store with release instruction for performing memory operation ordering, wherein the executing the store with release instruction comprises executing a first data memory barrier operation followed by executing a store operation followed by executing a second data memory barrier operation.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various embodiments provide for a system that simplifies load acquire and store release semantics that are used in reduced instruction set computing (RISC). In lock free computing, there are two ways in which threads can manipulate shared memory, they can compete with each other for a resource, or they can pass information co-operatively from one thread to another. These semantics are complex however, and replacing the specialized semantics with simple data memory barriers can simplify the process of memory ordering. Translating the semantics into micro-operations, or low-level instructions used to implement complex machine instructions, can avoid having to implement complicated new memory operations. Using a data memory barrier in conjunction with load and store instructions can provide sufficient ordering using simple brute force ordering operations.

As used in this disclosure, the terms "instruction", "operation", and "access" refer to separate processes and are not interchangeable. An instruction is composed of one or more operations, while an operation may include zero or more memory accesses or barriers. By way of example, a load with acquire instruction creates two operations (a load operations and a barrier operation). This barrier splits all memory accesses into two groups. The first group comprises accesses from all instructions prior to the load with acquire as well as the access from the load operation that belongs to the load with acquire. The second group comprises accesses from all instructions after the load with acquire instruction.

Figure 1:
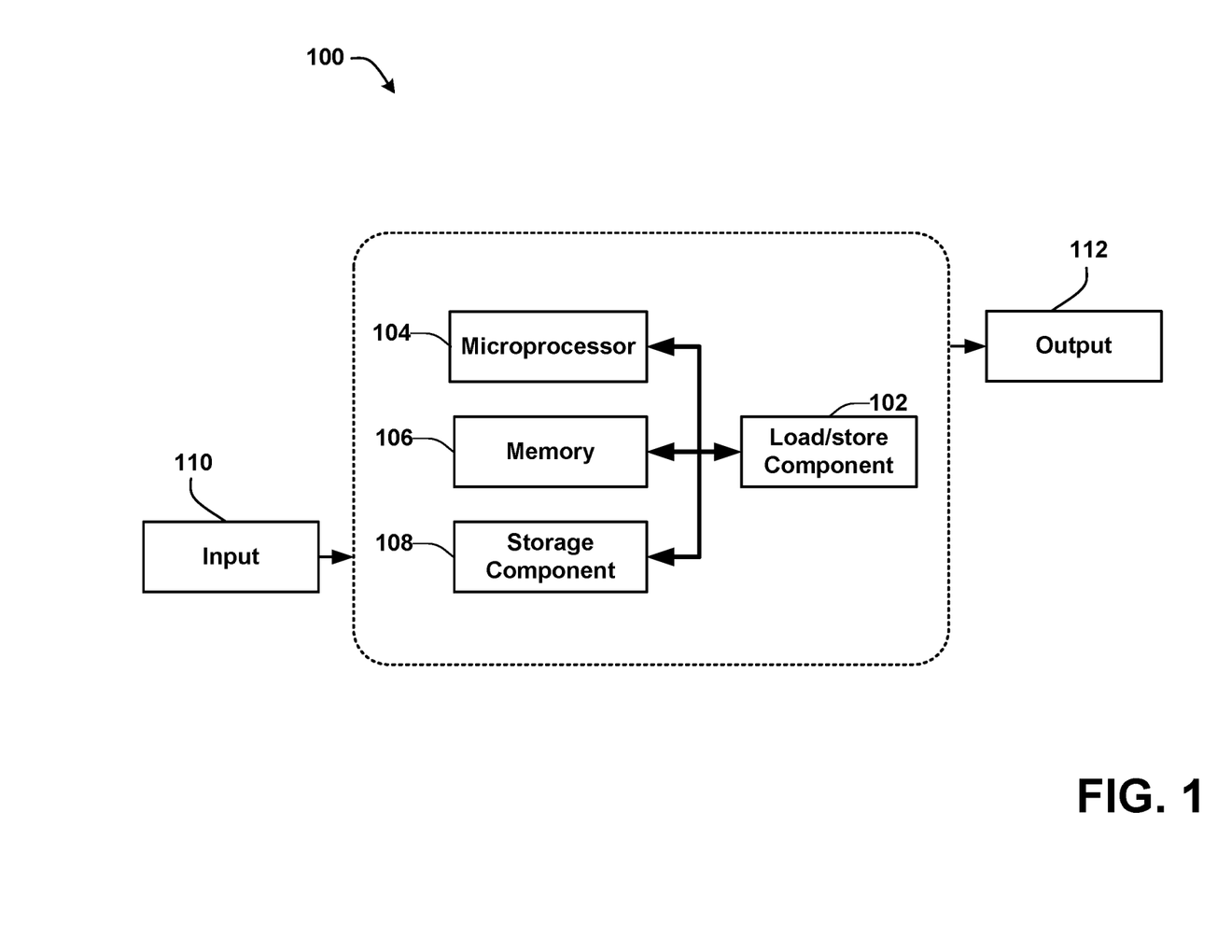
FIG. 1 is a block diagram illustrating an example, non-limiting embodiment of a system that filters memory operations in accordance with various aspects described herein.

Turning now to the illustrations. FIG. 1 illustrates a system 100 that filters memory operations using a data memory barrier in a RISC processor, processing environment, or architecture. The RISC processor can include variations of ARM processors, and specifically, in this embodiment, an ARMv8 processor. As illustrated, system 100 can include load/store component 102 that can be communicatively coupled and/or operationally coupled to processor 104 for facilitating operation and/or execution of computer executable instructions and/or components by system 100, memory 106 for storing data and/or computer executable instructions and/or components for execution by system 100 utilizing processor 104, for instance, and storage component 108 for providing longer term storage for data and/or computer executable instructions and/or components that can be executed by system 100 using processor 104, for example. Additionally, and as depicted, system 100 can receive input 110 that can be transformed by execution of one or more computer executable instructions and/or components, by the processor 104, from a first state to a second state, wherein the first state can be distinguished and/or is discernible and/or is different from the second state. System 100 can also produce output 112 that can include an article that has been transformed, through processing by system 100, into a different state or thing.

Figure 2:
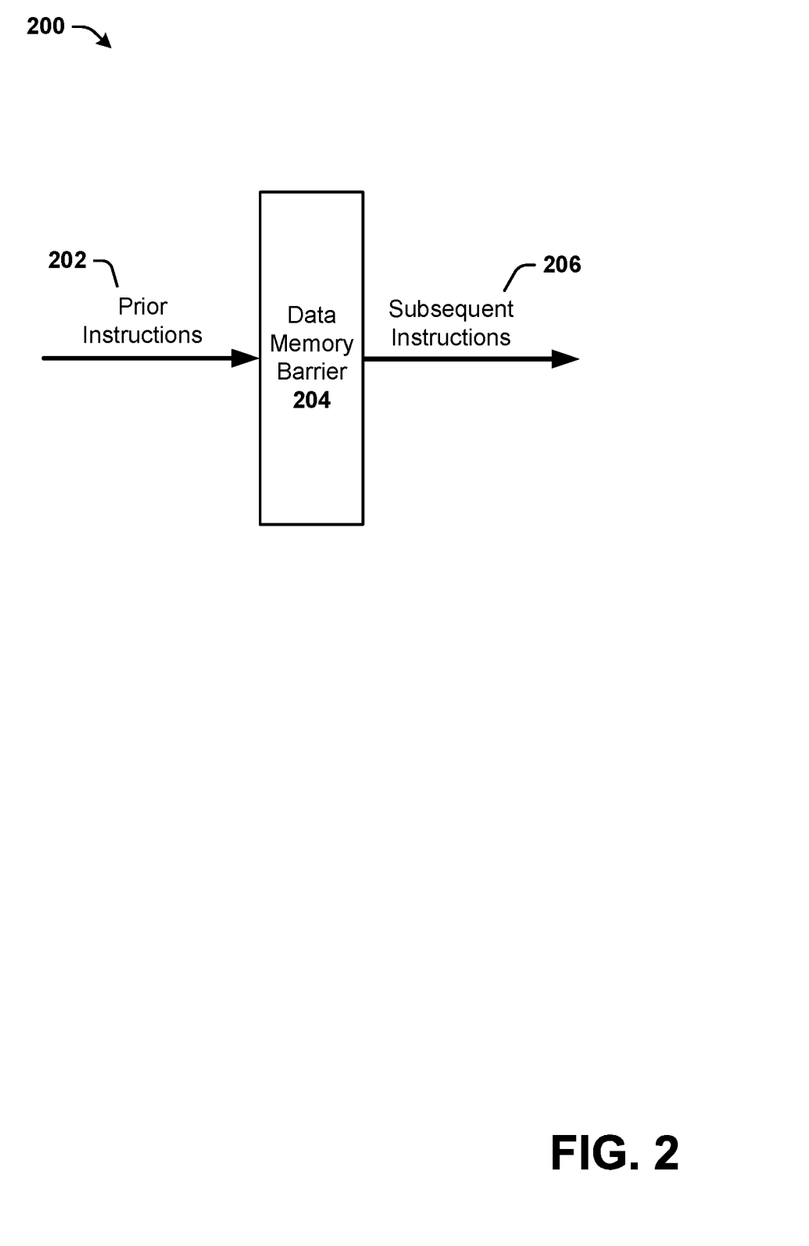
FIG. 2 is a block diagram illustrating an example, non-limiting embodiment of a system that filters memory operations in accordance with various aspects described herein.

Turning now to FIG. 2, illustrated is a block diagram of an example, non-limiting embodiment of a system that filters memory operations in accordance with various aspects described herein. System 200 includes a data memory barrier 204 that enforces an ordering constraint on prior instructions 202 and subsequent instructions 206. The data memory barrier 204 is a type of barrier operation which causes a CPU or compiler to enforce an ordering constraint on memory operations issued before and after the barrier operation. The typically means that certain operations are guaranteed to be performed before the barrier, and others after. Data memory barrier 204 ensures that prior instructions 202 are performed and completed before subsequent instructions 206 are executed. Prior instructions 202 and subsequent instructions 206 can each include various combinations of basic load and store instructions plus more complex variants of these instructions (e.g., load-exclusive with acquire, store-exclusive with release, and etc).

In an embodiment, the prior instructions 202 and subsequent instructions 206 can comprise load or store instructions that are configured for loading a first set of data from a memory and storing a second set of data to the memory. The data memory barrier 204 can be configured for ordering the memory operations associated with loading and storing the data, wherein the type of ordering accomplished is based on the position in a program order of the data memory relative to the one or more load instructions and store instructions.

Figure 3:
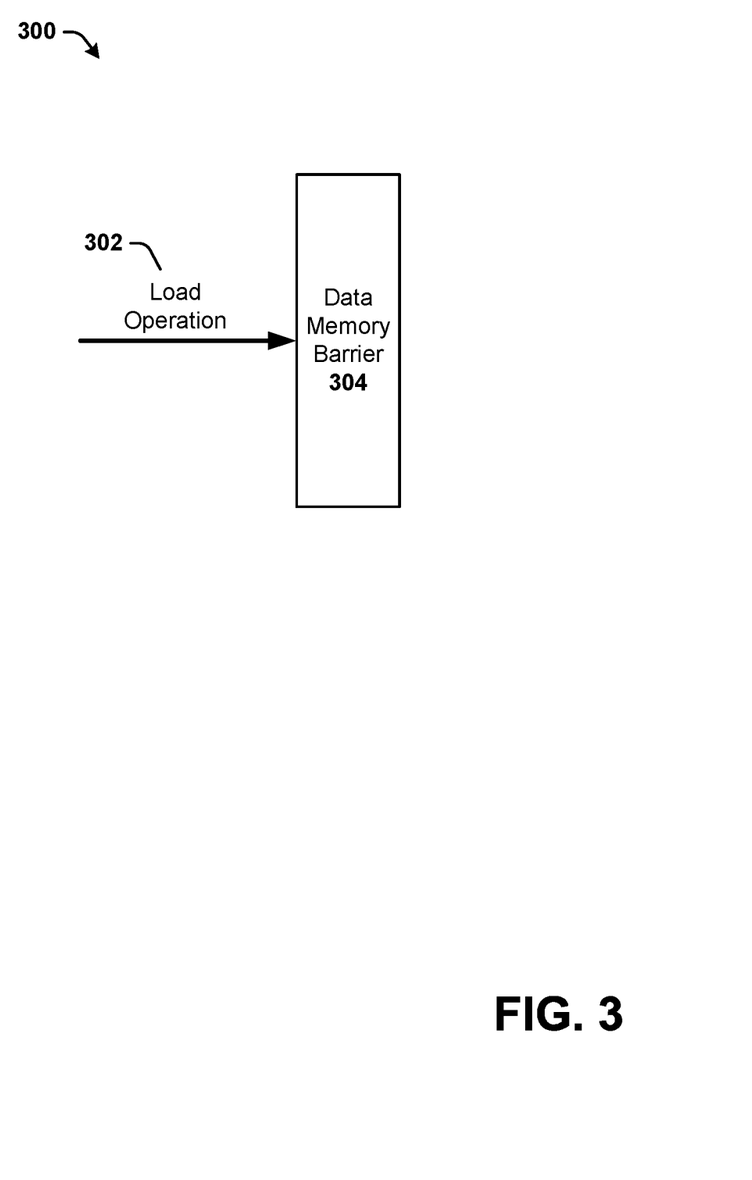
FIG. 3 is a block diagram illustrating an example, non-limiting embodiment of a system that filters memory operations in accordance with various aspects described herein.

Turning now to FIG. 3, a block diagram illustrating an example, non-limiting embodiment of a system that filters memory operations via a load with acquire instruction in accordance with various aspects described herein is shown. System 300 can include a data memory barrier 304 that orders load operation 302 that precedes the data memory barrier 304 in a program order. Data memory barrier 304 ensures that load operation 302 is performed and completed before subsequent instructions are executed. System 300 shows a simple load with acquire instruction that comprises a load operation and a data memory barrier operation. In other embodiments, other types of load operations can result in different load instructions, such as load exclusive with acquire and other variants.

Figure 4:
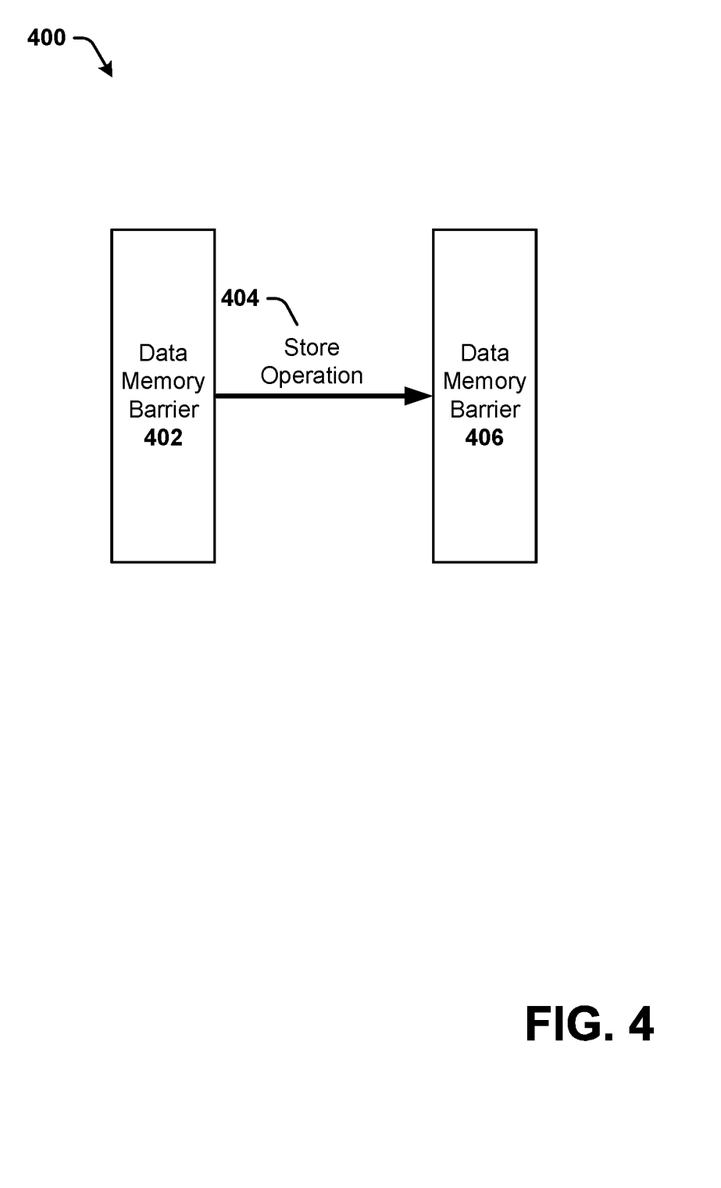
FIG. 4 is a block diagram illustrating an example, non-limiting embodiment of a system that filters memory operations in accordance with various aspects described herein.

Turning now to FIG. 4, illustrated is an example, non-limiting embodiment of a system that performs a store with release instruction in accordance with various aspects described herein is shown. System 400 can include data memory barriers 402 and 406 on either side of a store operation 404 in a program order. Data memory barrier 402 ensures that all prior instructions/operations have ceased before store operation 404 is initiated, while data memory barrier 406 ensures that store operation 404 is completed before any subsequent memory instructions/operations occur. In addition, the first data memory barrier 402 and the second data memory barrier 406 also create an ordering to ensure that store with release and load with acquire instructions are observed in program order.

Figure 5:
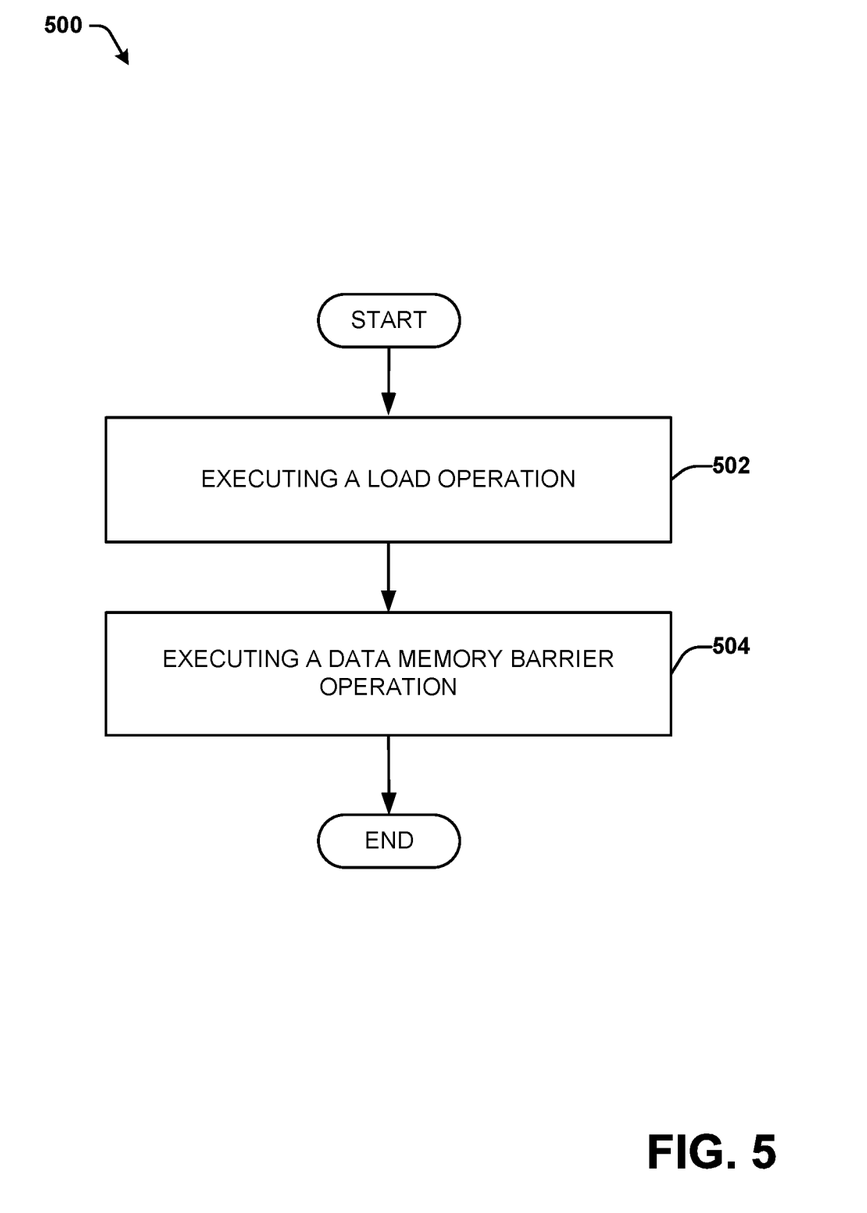
FIG. 5 illustrates a flow diagram of an example, non-limiting embodiment of a method for executing a load with acquire instruction.
Figure 6:
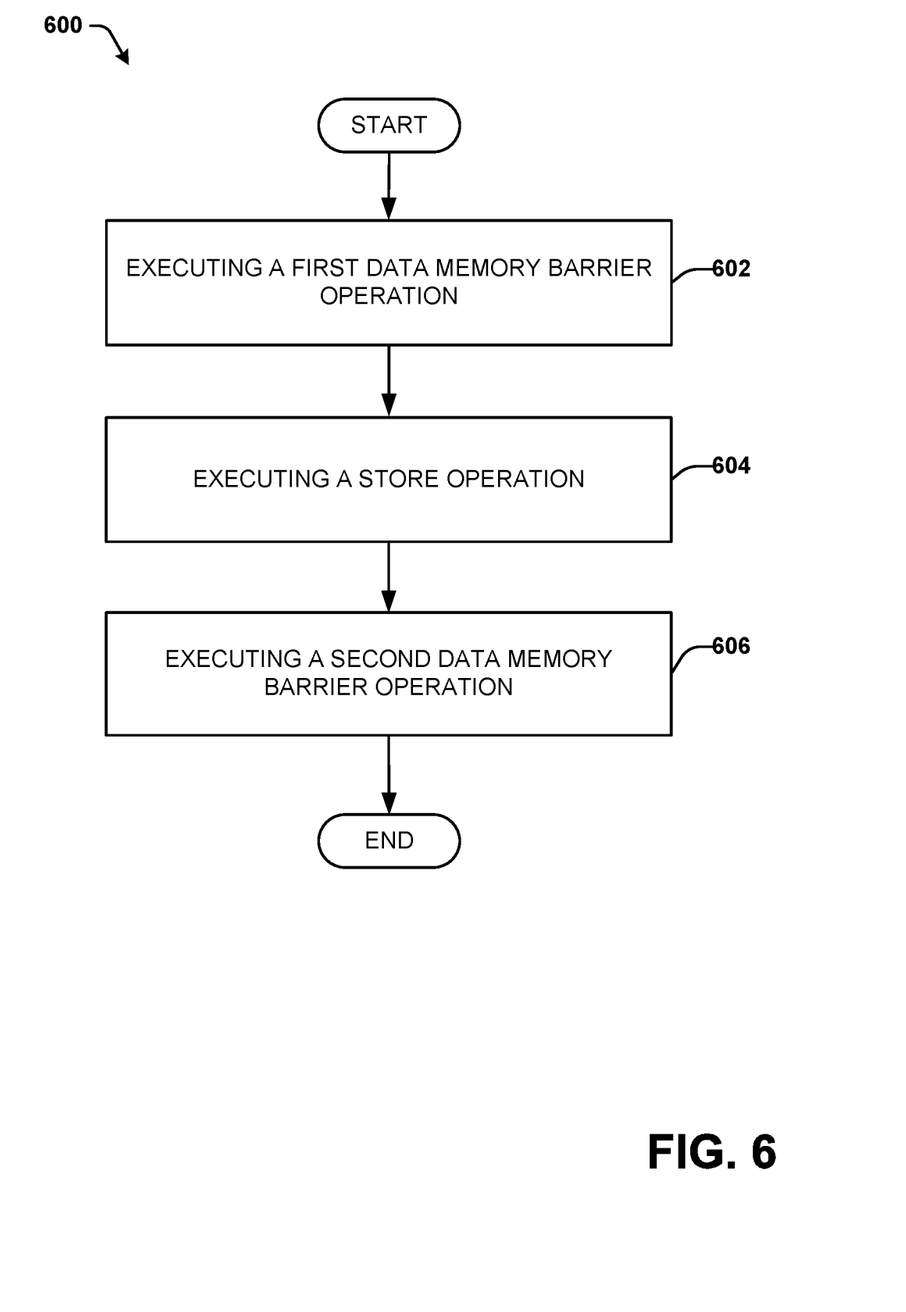
FIG. 6 illustrates a flow diagram of an example, non-limiting embodiment of a method for executing a store with release instruction.
Figure 7:
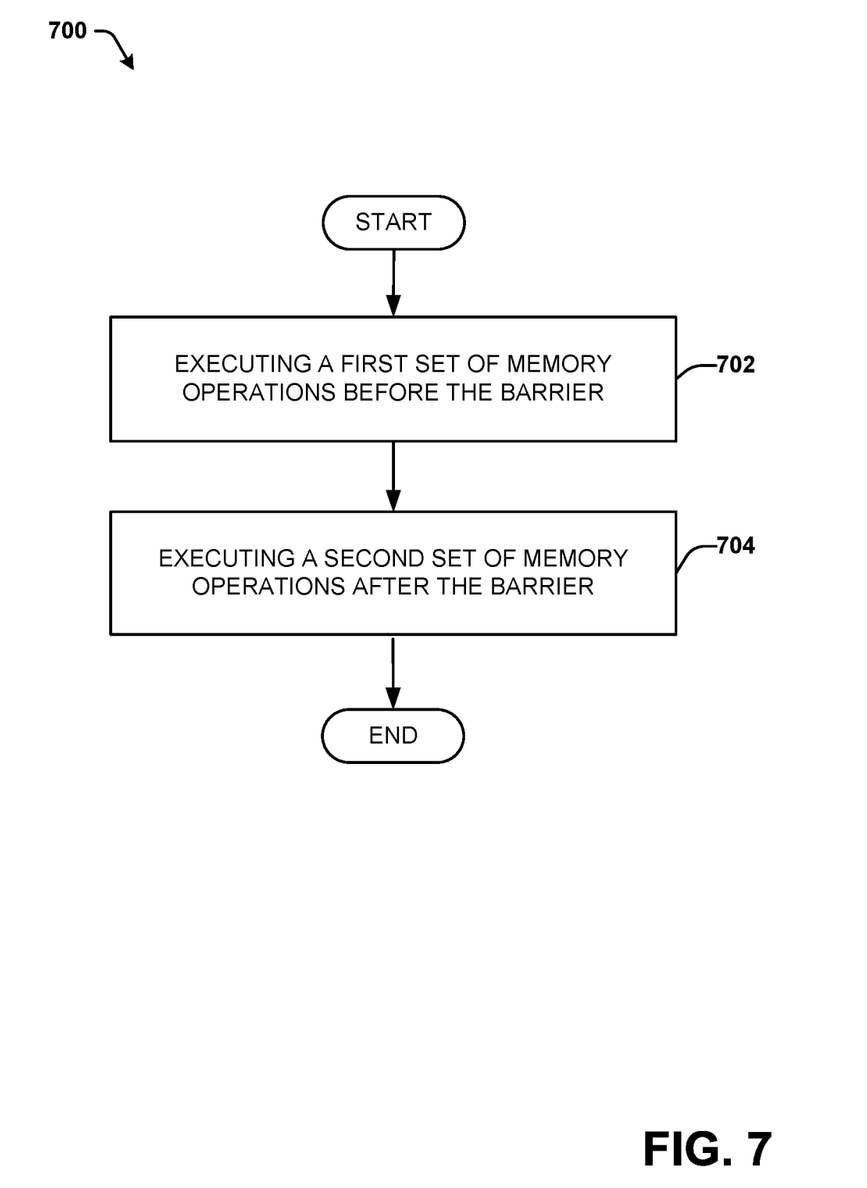
FIG. 7 illustrates a flow diagram of an example, non-limiting embodiment of a method for filtering memory operations using a data memory barrier.

In view of the example systems described above, methods that may be implemented in accordance with the described subject matter may be better appreciated with reference to the flow charts of FIGS. 5-7. While for purposes of simplicity, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring now to FIG. 5, illustrated is a flow diagram of an example, non-limiting embodiment of a method for executing a load with acquire instruction. Methodology 500 can start at 502, where a load operation is executed, wherein the load operation specifies an address for accessing a data from a memory.

At 504, a data memory barrier can be executed. The data memory barrier is a type of barrier operation which causes a CPU or compiler to enforce an ordering constraint on memory operations issued before and after the barrier instruction. The typically means that certain operations are guaranteed to be performed before the barrier, and others after. Data memory barrier ensures that prior instructions are performed and completed before subsequent instructions are executed. In this instance, the data memory barrier operation ensures that the prior load operation is performed and completed before subsequent instructions are executed.

Turning now to FIG. 6, illustrated is a flow diagram of an example, non-limiting embodiment of a method for executing a store with release instruction. Methodology 600 can start at 602, where a first data memory barrier operation is executed. The data memory barrier is a type of barrier instruction which causes a CPU or compiler to enforce an ordering constraint on memory operations issued before and after the barrier instruction.

At 604, a store operation is executed. The store operation specifies an address for writing data to memory. At 606, a second data memory barrier operation is executed. Having a store operation between two data memory barrier operations ensures that all other memory operations have been performed and are completed before the store operation is executed, and then no other memory operations are allowed until the store operation is completed. In this way, the store with release instruction performed memory operation ordering using simple store and data memory barrier operations.

Turning now to FIG. 7, a flow diagram of an example, non-limiting embodiment of a method for filtering memory operations using a data memory barrier operation. Methodology 700 can start at 702, where a first set of memory operations are executed before a barrier. The barrier ensures that all instructions are completed before step 704, where a second set of memory operations are executed after the data memory barrier.

Example Computing Environment

Figure 8:
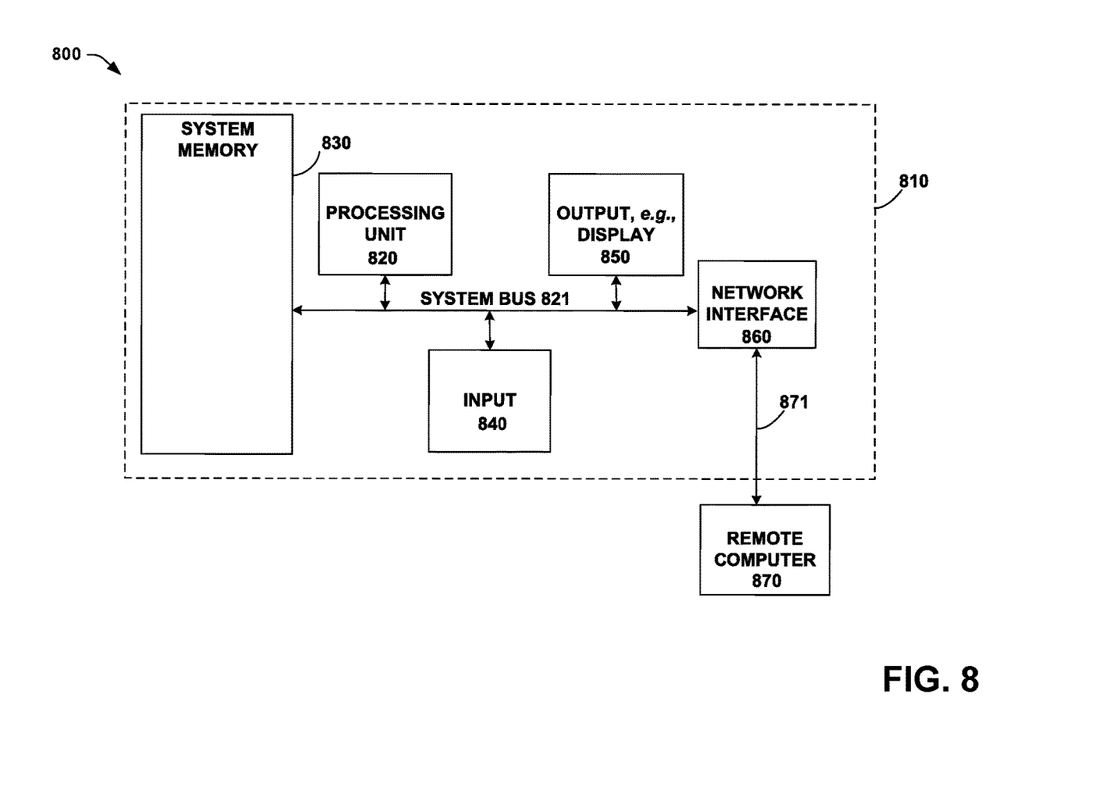
FIG. 8 illustrates a block diagram of an example electronic computing environment that can be implemented in conjunction with one or more aspects described herein.

As mentioned, advantageously, the techniques described herein can be applied to any reduced instruction set computing environment where it is desirable to perform memory operation ordering or filtering. It is to be understood, therefore, that handheld, portable and other computing devices and computing objects of all kinds are contemplated for use in connection with the various non-limiting embodiments, i.e., anywhere that memory operation ordering may be performed. Accordingly, the below general purpose remote computer described below in FIG. 8 is but one example, and the disclosed subject matter can be implemented with any client having network/bus interoperability and interaction. Thus, the disclosed subject matter can be implemented on chips or systems in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 8 thus illustrates an example of a suitable computing system environment 800 in which some aspects of the disclosed subject matter can be implemented, although as made clear above, the computing system environment 800 is only one example of a suitable computing environment for a device and is not intended to suggest any limitation as to the scope of use or functionality of the disclosed subject matter. Neither should the computing environment 800 be interpreted as having any dependency or requirement relating to any one or combination of components illustrated in the exemplary operating environment 800.

With reference to FIG. 8, an exemplary device for implementing the disclosed subject matter includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computer 810 typically includes a variety of computer readable media. Computer readable media can be any available media that can be accessed by computer 810. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules, or other data in a modulated data signal such as a carrier wave or other transport mechanism and includes any information delivery media.

The system memory 830 may include computer storage media in the form of volatile and/or nonvolatile memory such as read only memory (ROM) and/or random access memory (RAM). A basic input/output system (BIOS), containing the basic routines that help to transfer information between elements within computer 810, such as during start-up, may be stored in memory 830. Memory 830 typically also contains data and/or program modules that are immediately accessible to and/or presently being operated on by processing unit 820. By way of example, and not limitation, memory 830 may also include an operating system, application programs, other program modules, and program data.

The computer 810 may also include other removable/non-removable, volatile/nonvolatile computer storage media. For example, computer 810 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 821 through a non-removable memory interface such as an interface, and a magnetic disk drive or optical disk drive is typically connected to the system bus 821 by a removable memory interface, such as an interface.

A user can enter commands and information into the computer 810 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 820 through user input 840 and associated interface(s) that are coupled to the system bus 821, but may be connected by other interface and bus structures, such as a parallel port, game port, or a universal serial bus (USB). A graphics subsystem can also be connected to the system bus 821. A projection unit in a projection display device, or a HUD in a viewing device or other type of display device can also be connected to the system bus 821 via an interface, such as output interface 850, which may in turn communicate with video memory. In addition to a monitor, computers can also include other peripheral output devices such as speakers which can be connected through output interface 850.

The computer 810 can operate in a networked or distributed environment using logical connections to one or more other remote computer(s), such as remote computer 870, which can in turn have media capabilities different from device 810. The remote computer 870 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 810. The logical connections depicted in FIG. 8 include a network 871, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 810 can be connected to the LAN 871 through a network interface or adapter. When used in a WAN networking environment, the computer 810 can typically include a communications component, such as a modem, or other means for establishing communications over the WAN, such as the Internet. A communications component, such as wireless communications component, a modem and so on, which can be internal or external, can be connected to the system bus 821 via the user input interface of input 840, or other appropriate mechanism. In a networked environment, program modules depicted relative to the computer 810, or portions thereof, can be stored in a remote memory storage device. It will be appreciated that the network connections shown and described are exemplary and other means of establishing a communications link between the computers can be used.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, NAND and NOR memory refer to two types of flash memory based on the NAND and NOR logic gates that they respectively use. The NAND type is primarily used in main memory cards, USB flash drives, solid-state drives, and similar products, for general storage and transfer of data. The NOR type, which allows true random access and therefore direct code execution, is used as a replacement for the older EPROM and as an alternative to certain kinds of ROM applications. However, NOR flash memory can emulate ROM primarily at the machine code level; many digital designs need ROM (or PLA) structures for other uses, often at significantly higher speeds than (economical) flash memory may achieve. NAND or NOR flash memory is also often used to store configuration data in numerous digital products, a task previously made possible by EEPROMs or battery-powered static RAM.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A non-transitory computer-readable medium having stored thereon a memory access instruction which, when executed by a processor, causes the processor to:
perform a first memory access operation, the first memory access operation comprising at least one first micro-operation that is a memory load operation;
perform a first data memory barrier operation associated with the first memory access operation, the first data memory barrier operation comprising at least one second micro-operation, the first data memory barrier operation imposing an order of operations on all prior memory access operations before the first data memory barrier operation, all the prior memory access operations including the first memory access operation.

2. The non-transitory computer-readable medium of claim 1, wherein the first memory access operation is performed and completed before the first data memory barrier operation based on the order of operations.

3. The non-transitory computer-readable medium of claim 1, wherein the memory access instruction is a load with acquire instruction.

4. The non-transitory computer-readable medium of claim 1, wherein the first memory access operation is configured to specify an address for accessing a data from a memory.

5. The non-transitory computer-readable medium of claim 1, wherein the memory access instruction, when executed by the processor, causes the processor to:
perform a second data memory barrier operation associated with an additional memory access operation, the second data memory barrier operation comprising at least one third micro-operation, wherein the second data memory barrier operation enforces an ordering constraint ensuring that the additional memory access operation is completed before performing the second data memory barrier operation.

6. The non-transitory computer-readable medium of claim 5, wherein the first data memory barrier operation is performed before the additional memory access operation and the second data memory barrier operation is performed following the additional memory access operation based on the ordering constraint.

7. The non-transitory computer-readable medium of claim 5, wherein the additional memory access instruction comprises a store with release instruction.

8. A processor configured to perform computer-executable instructions configured to:
   perform a first memory access operation, the first memory access operation comprising at least one first micro-operation that is a memory load operation; and
   perform a first data memory barrier operation associated with the first memory access operation, the first data memory barrier operation comprising at least one second micro-operation, the first data memory barrier operation imposing an order of operations on all prior memory access operations before the first data memory barrier operation, all the prior memory access operations including the first memory access operation.

9. The processor of claim 8, wherein the processor is configured to perform and complete the first memory access operation before the first data memory barrier operation based on the order of operations.

10. The processor of claim 8, wherein the memory access instruction is a load with acquire instruction.

11. The processor of claim 8, wherein the memory access instruction, when executed by the processor, causes the processor to:
   perform a second data memory barrier operation associated with an additional memory access operation, the second data memory barrier operation comprising at least one third micro-operation,
   wherein the second data memory barrier operation enforces an ordering constraint ensuring that the additional memory access operation is completed before performing the second data memory barrier operation.

12. The processor of claim 11, wherein the first data memory barrier operation is performed before the additional memory access operation and the second data memory barrier operation is performed following the additional memory access operation based on the ordering constraint.

13. The processor of claim 11, wherein the additional memory access instruction comprises a store with release instruction.

14. The processor of claim 8, wherein the processor is a reduced instruction set computing (RISC) processor.

15. The processor of claim 14, wherein the processor is an advanced RISC machine (ARM) processor.

16. A computer-implemented method comprising:
   performing a first memory access operation, the memory access operation comprising at least one first micro-operation with a memory load operation; and
   performing a first data memory barrier operation associated with the first memory access operation, the first data memory barrier operation comprising at least one second micro-operation, the first data memory barrier operation imposing an order of operations on all prior memory access operations before the first data memory barrier operation, all the prior memory access operations including the first memory access operation.

17. The computer-implemented method of claim 16, wherein the first memory access operation is performed and completed before the first data memory barrier operation based on the order of operations.

18. The computer-implemented method of claim 16, wherein the first data memory barrier operation is associated with the first memory access operation via a memory access instruction, wherein the memory access instruction is a load with acquire instruction.

19. The computer-implemented method of claim 16, wherein the first data memory barrier operation is associated with the first memory access operation via a memory access instruction, wherein the memory access instruction, when executed by the processor, causes the processor to:
   perform a second data memory barrier operation associated with an additional memory access operation, the second data memory barrier operation comprising at least one third micro-operation,
   wherein the second data memory barrier operation enforces an ordering constraint ensuring that the additional memory access operation is completed before performing the second data memory barrier operation.

20. The computer-implemented method of claim 19, wherein the first data memory barrier operation is performed before the additional memory access operation and the second data memory barrier operation is performed following the additional memory access operation based on the ordering constraint.

21. The computer-implemented method of claim 16, wherein the first data memory barrier operation is associated with the first memory access operation via a memory access instruction,
   wherein the memory access instruction, when executed by the processor, causes the processor to:
   perform an additional memory access operation comprising at least one fourth micro-operation,
   wherein the first data memory barrier operation enforces an ordering constraint of the order of operations on at least one subsequent memory access operation executed after the first data memory barrier operation, the at least one subsequent memory access operation including the additional memory access operation.

22. The computer-implemented method of claim 21, wherein the first memory access operation is a load with acquire operation and the additional memory access operation is a store operation.

23. The computer-implemented method of claim 21, wherein the first data memory barrier operation defines the order of operations for all prior memory access operations and the at least one subsequent memory access operation.

24. The computer-implemented method of claim 16, wherein all the prior memory access operations include an additional load operation.

* * * * *